US010200950B2

(12) United States Patent
Park et al.

(10) Patent No.: US 10,200,950 B2
(45) Date of Patent: *Feb. 5, 2019

(54) APPARATUS, SYSTEM AND METHOD OF DISCOVERING A WIRELESS COMMUNICATION DEVICE

(71) Applicant: INTEL IP CORPORATION, Santa Clara, CA (US)

(72) Inventors: Minyoung Park, Portland, OR (US); Emily H. Qi, Gig Harbor, WA (US); Venkatakrishna U. Yellepeddy, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,143

(22) Filed: Dec. 28, 2016

(65) Prior Publication Data

US 2017/0111782 A1 Apr. 20, 2017

Related U.S. Application Data

(63) Continuation of application No. 14/472,407, filed on Aug. 29, 2014.
(Continued)

(51) Int. Cl.
*G08C 17/00* (2006.01)
*H04W 52/02* (2009.01)
(Continued)

(52) U.S. Cl.
CPC ....... *H04W 52/0225* (2013.01); *H04W 8/005* (2013.01); *H04W 52/0216* (2013.01);
(Continued)

(58) Field of Classification Search
CPC . H04W 48/08; H04W 48/10; H04W 52/0235; H04W 8/005; H04W 52/0225;
(Continued)

(56) References Cited

U.S. PATENT DOCUMENTS 7,359,753 B2    4/2008  Bange et al.
9,055,513 B2 *  6/2015  Ding ..................... H04W 48/08
(Continued)

OTHER PUBLICATIONS

IEEE Std 802.111™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Hanh N Nguyen
(74) *Attorney, Agent, or Firm* — Shichrur & Co.

(57) ABSTRACT

Some demonstrative embodiments include apparatuses, systems and/or methods of discovering a wireless communication device. For example, a first wireless device may include a radio to communicate over a wireless communication medium according to a discovery scheme including a plurality of contention-based discovery windows (DWs), the radio to communicate with a second wireless device a discovery frame during a first discovery process, the discovery frame including an indication of one or more selected DWs of the plurality of DWs; and a controller to switch the first wireless device between a power save state and an active state, the controller to switch the first wireless device to operate in the active state in the one or more selected discovery windows to discover the second wireless device during a second discovery process, subsequent to the first discovery process.

40 Claims, 6 Drawing Sheets

Related U.S. Application Data

(60) Provisional application No. 62/010,279, filed on Jun. 10, 2014.

(51) Int. Cl.
*H04W 8/00* (2009.01)
*H04W 76/27* (2018.01)

(52) U.S. Cl.
CPC ....... *H04W 52/0219* (2013.01); *H04W 76/27* (2018.02); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01)

(58) Field of Classification Search
CPC ....... H04W 56/00; H04W 84/18; H04W 8/00; H04W 74/08
See application file for complete search history.

(56) References Cited

U.S. PATENT DOCUMENTS

| | | | | |
|---|---|---|---|---|
| 9,572,007 | B2* | 2/2017 | Park | H04W 8/005 |
| 2011/0038290 | A1* | 2/2011 | Gong | H04W 52/0235 |
| | | | | 370/311 |
| 2014/0301295 | A1 | 10/2014 | Abraham et al. | |
| 2014/0313966 | A1* | 10/2014 | Shukla | H04W 48/10 |
| | | | | 370/312 |
| 2015/0200811 | A1 | 7/2015 | Kasslin et al. | |
| 2015/0319675 | A1 | 11/2015 | Park et al. | |
| 2015/0358800 | A1 | 12/2015 | Park et al. | |
| 2016/0014565 | A1 | 1/2016 | Segev et al. | |
| 2017/0111782 | A1 | 4/2017 | Park et al. | |
| 2017/0111862 | A1* | 4/2017 | Park | H04W 52/0225 |

OTHER PUBLICATIONS

Wi-Fi Alliance Technical Committee P2P Task Group, Wi-Fi Peer-to-Peer (P2P) Technical Specification, Version 1.2, Dec. 14, 2011, 160 pages.

Office Action for U.S. Appl. No. 14/472,407, dated Feb. 12, 2016, 15 pages.

Notice of Allowance for U.S. Appl. No. 14/472,407, dated Sep. 23 2016, 7 pages.

Office Action for U.S. Appl. No. 14/472,407, dated Jul. 6, 2016, 13 pages.

Office Action for U.S. Appl. No. 15/390,595, dated Mar. 22, 2018, 23 pages.

Office Action for U.S. Appl. No. 15/390,595, dated Sep. 17, 2018, 11 pages.

Notice of Allowance for U.S. Appl. No. 15/390,595, dated Dec. 12, 2018, 8 Pages.

* cited by examiner

| Field | Size (octets) | Value | Description |
|---|---|---|---|
| Attribute ID | 1 | TBD | Identifies the type of NAN attribute |
| Length | 2 | 2 | Length of the following fields is the attribute |
| DW Wake-up Schedule | 2 | Variable | A 2-byte field bitmap. Each bit position indicates DW index. |

302 — Attribute ID
304 — Length
306 — DW Wake-up Schedule

APPARATUS, SYSTEM AND METHOD OF DISCOVERING A WIRELESS COMMUNICATION DEVICE

CROSS REFERENCE

This Application is a Continuation Application of U.S. patent application Ser. No. 14/472,407, filed on Aug. 29, 2014, which claims the benefit of and priority from U.S. Provisional Patent Application No. 62/010,279 entitled "Method And Apparatus For Wi-Fi NAN Discovery Window Synchronization", filed Jun. 10, 2014, the entire disclosures of which are incorporated herein by reference.

TECHNICAL FIELD

Embodiments described herein generally relate to discovering a wireless communication device.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be performed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a DW wake-up schedule attribute, in accordance with some demonstrative embodiments.

DETAILED DESCRIPTION

Figure 1:
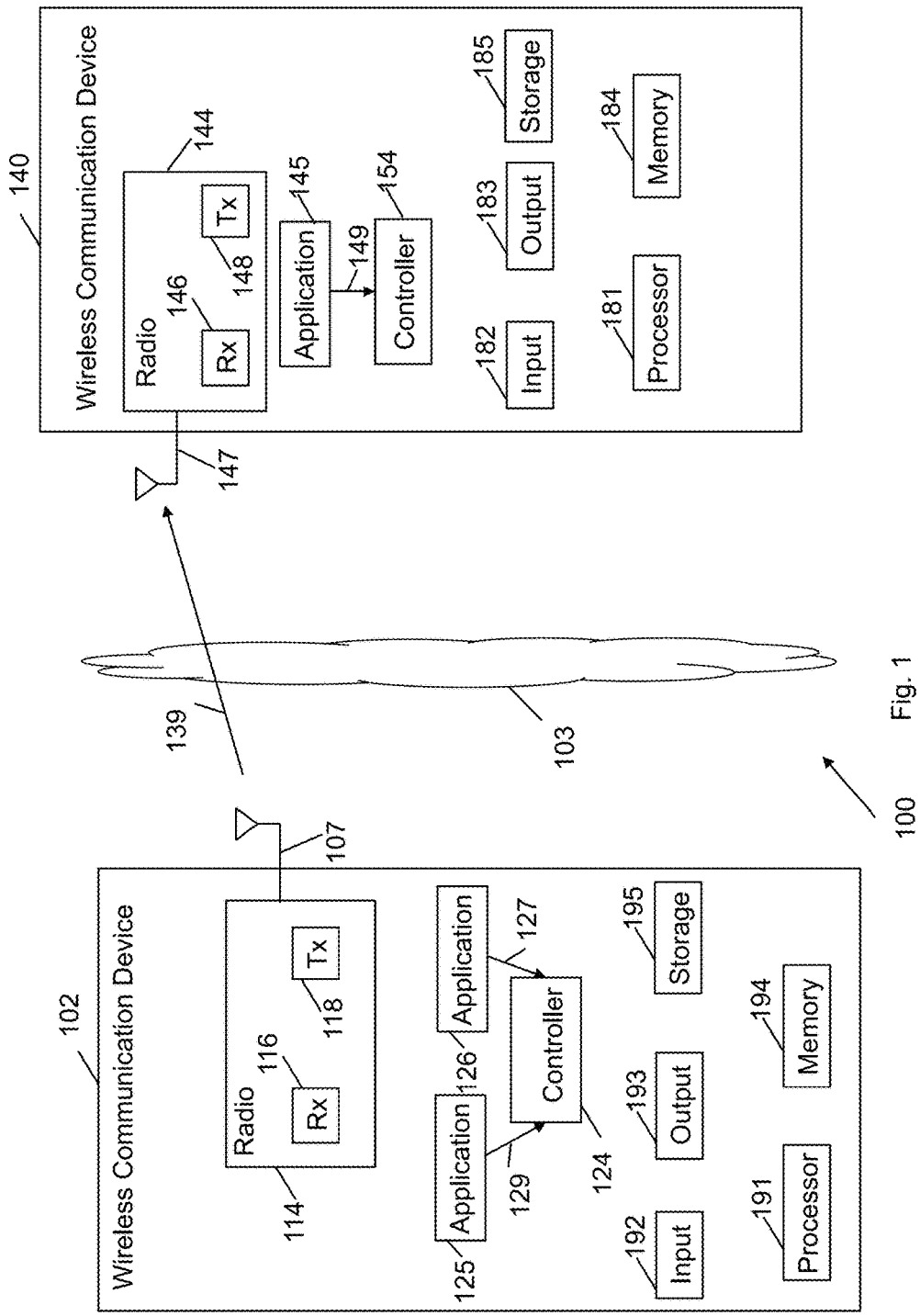
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY)*

Specifications, Mar. 29, 2012; IEEE802.11ac-2013 ("IEEE P802.11ac-2013, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "powering down" and "power down" as used herein with relation to a device and/or a component may refer, for example, to reducing, diminishing, shutting down, powering off, turning off and/or switching off the electrical current to the device and/or component, and/or to switching the device and/or component to operate at a sleep mode, a reduced-power mode, a stand-by mode and/or any other operation mode which consumes less power than required for full and/or normal operation of the device and/or component.

The phrases "powering up", "power up", "wake up" and 'waking up" as used herein with relation to a device and/or a component may refer, for example, to enhancing, resuming, turning on and/or switching on the electrical current to the device and/or component and/or to changing the device and/or component from sleep mode, stand by mode or any other operation mode, which consumes less power than required for full and/or normal operation of the device and/or component, to an operational mode.

The phrases "power save", "power-save state" and "idle power state", as used herein, with relation to a device and/or a component may refer, for example, to operation of the device and/or the component at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of data.

The phrases "active" and "active state", as used herein, with relation to a device and/or a component, may refer, for example, to an operational mode, which enables full and/or normal operation of the device and/or component, e.g., full reception, handling, decoding, transmitting and/or processing of data.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, or a 5

GHz frequency band, a millimeterWave (mmWave) frequency band, e.g., a 60 GHz frequency band, or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form a wireless local area network (WLAN).

In some demonstrative embodiments, wireless communication devices 102 and/or 140 may form a WiFi network.

In some demonstrative embodiments, wireless communication medium 103 may include a direct link, e.g., a P2P link, for example, to enable direct communication between device 102 and device 140.

In some demonstrative embodiments, wireless communication devices 102 and/or 140 may perform the functionality of WFA P2P devices. For example, device 102 may perform the functionality of a P2P client device, and/or device 140 may perform the functionality of a P2P client device.

In some demonstrative embodiments, wireless communication devices 102 and/or 140 may form a WiFi direct services (WFDS) network.

In some demonstrative embodiments, wireless communication devices 102 and/or 140 may form a WiFi Neighbor Awareness Networking (NAN) network.

In other embodiments, wireless communication devices 102 and/or 140 may form any other network.

For example, devices 102 and/or 140 may include NAN devices, which may share a common set of NAN parameters, e.g., including a common time period between consecutive discovery windows (DWs), e.g., as described below.

In some demonstrative embodiments, devices 102 and/or 140 may perform the functionality of a NAN device capable of discovering other NAN devices.

In some demonstrative embodiments, devices 102 and/or 140 may include one or more applications configured to provide and/or to use one or more services using the NAN network, e.g., a social application, a file sharing application, a media application and/or the like.

In some demonstrative embodiments, device 102 may execute an application 125 and/or an application 126.

In some demonstrative embodiments, device 140 may execute an application 145.

In some demonstrative embodiments, radios 114 and/or 144 may communicate over wireless communication medium 103 according to a discovery scheme, e.g., a NAN discovery scheme, or any other discovery scheme.

In some demonstrative embodiments, one or more of devices 102 and/or 140 may perform a discovery process according to the discovery scheme, for example, to discover each other and/or to establish a directional and/or high throughput wireless communication link.

In some demonstrative embodiments, the discovery scheme may include a plurality of contention-based discovery windows (DWs).

In some demonstrative embodiments, devices 102 and/or 140 may transmit discovery frames during the plurality of DWs.

In one example, devices 102 and/or 140 may transmit the discovery frames to discover each other, for example, to use the one or more services provided by applications 125, 126 and/or 145.

In some demonstrative embodiments, devices 102 and/or 140 may communicate during a DW according to a contention mechanism. For example, devices 102 and/or 140 may check whether or not a channel is unoccupied prior to an attempt to transmit a discovery frame during the discovery window.

In some demonstrative embodiments, a device of devices 102 and/or 140, e.g., device 102, may not transmit the discovery frame during the DW, e.g., if the channel is occupied.

In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other frame.

In some demonstrative embodiments, the discovery frame may not require an acknowledgement frame. Therefore, a transmitter of the discovery frame may not backoff a transmission of the discovery frame.

In some demonstrative embodiments, the discovery frame transmitted by device 102 during the DW may enable other devices or services that are running on other devices to discover the device.

In some demonstrative embodiments, devices 102 and/or 140 may include a controller configured to control the discovery of devices 102 and/or 140. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In some demonstrative embodiments, controller 124 may be configured to switch device 102 between a power save state and an active state; and/or controller 154 may be configured to switch device 140 between the power save state and the active state.

In some demonstrative embodiments, devices 102 and/or 140 may be allowed to operate at a power save state between DWs and during one or more DWs, and may wake up from the power save state to an active state, for example, to transmit the discovery frame during a DW.

For example, controller 124 may wake up device 102 from the power save state for a DW, for example, to transmit a discovery frame.

In some demonstrative embodiments, controllers 124 and/or 154 may periodically switch devices 102 and/or 140 to the active state at an interval including a predefined number of DWs.

In some demonstrative embodiments, the interval may include sixteen DWs, e.g., as described below.

Figure 2:
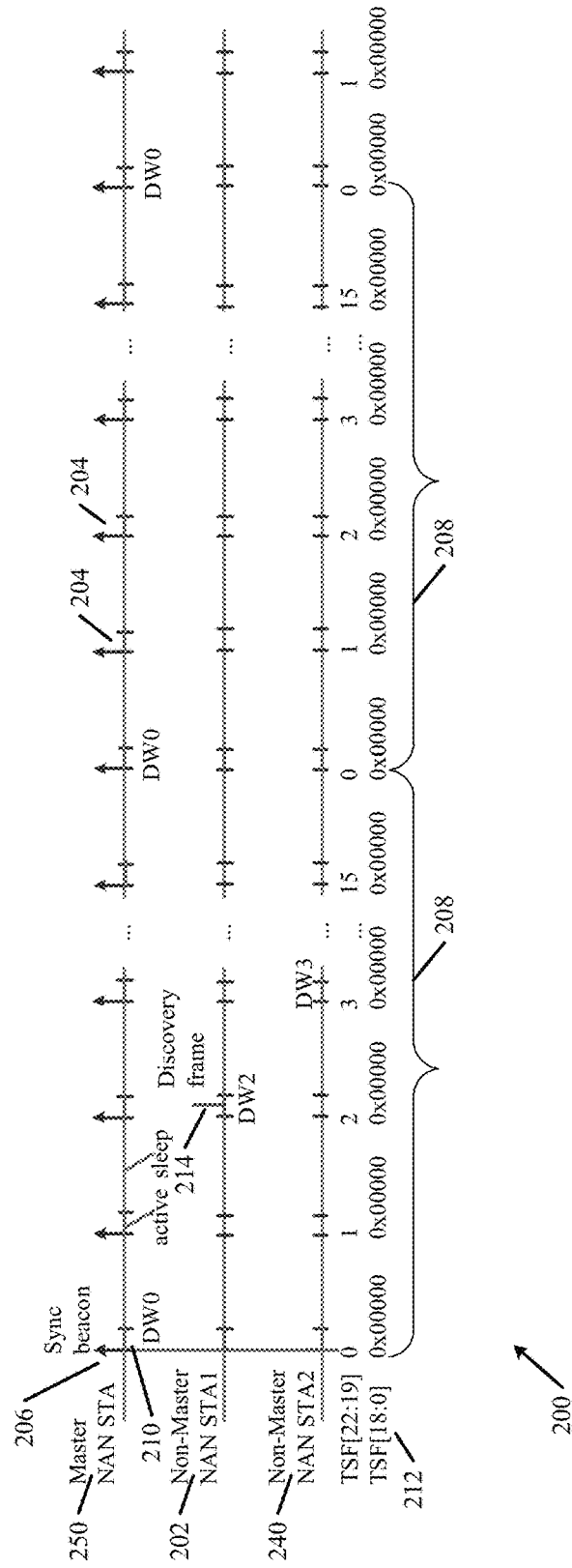
FIG. 2 is a schematic illustration of a discovery scheme, in accordance with some demonstrative embodiments.

Reference made to FIG. 2, which schematically illustrates a discovery scheme 200 of a first non-master NAN device 202, a second non-master NAN device 240, and/or a Master NAN device 250, in accordance with some demonstrative embodiments. For example, device 202 may perform the functionality of device 102 (FIG. 1), and/or device 240 may perform the functionality of device 140 (FIG. 1).

As shown in FIG. 2, discovery scheme 200 may include a plurality of DWs 204 synchronized by a plurality of respective synchronization beacons 206 transmitted by master device 250.

As shown in FIG. 2, the master device 250 may be at an active state during the plurality of DWs 204, for example, to enable devices 202 and/or 240 to discover master device 250.

As shown in FIG. 2, the plurality of DWs 204 may be arranged according to intervals 208.

As shown in FIG. 2, an interval 208 may include sixteen DWs, e.g., denoted DW0, DW1, DW2 . . . DW15.

As shown in FIG. 2, interval 208 may begin with a first DW 210, denoted DW0, and may end with a sixteenth DW, denoted DW15.

In some demonstrative embodiments, controller 124 (FIG. 1) may be configured to wake up device 202 during DW0; and/or controller 154 (FIG. 1) may be configured to wake up device 240 during DW0.

As shown in FIG. 2, tDW0 may be repeated every sixteen DWs.

As shown in FIG. 2, a device, e.g., device 202 and/or device 204 may determine a timing of the DWs according to a Time Synchronization Function (TSF) value 212 of devices 202 and/or 240.

In some demonstrative embodiments, controllers 124 and/or 154 (FIG. 1) may determine a timing of a DW based on four bits of the TSF value.

In one example, controllers 124 and/or 154 (FIG. 1) may determine a timing of when all 23 Least Significant Bits (LSBs) of TSF 212 are zero, e.g., TSF bits [22:00] are all zero.

In some demonstrative embodiments, controllers 124 and/or 154 (FIG. 1) may determine a timing of an n-th DW based on four bits of TSF 212, e.g., TSF bits [22:19], for example, when all 19 LSBs of TSF 212, e.g., TSF bits [18:00] are all zeros.

For example, the n-th DW may begin when n=(TSF[22:19] mod 16), and TSF[18:00] are all zeros.

In one example, controller 124 may determine a beginning of the $6^{th}$ DW of the interval, e.g., when the 4 bits [22:19] of the TSF value modulo 16 equals to 6; and/or the beginning of the 13th DW of the interval, e.g., when the 4 bits [22:19] of the TSF value modulo 16 equals to 13.

In some demonstrative embodiments, devices 202 and/or 240 may require a relatively long period of time to discover each other, for example, if controllers 124 and/or 154 (FIG. 1) wake up devices 202 and/or 240 only during DW0.

In one example, a time period between two consecutive DWs 204 may be 512 time units (TUs). A time unit may be equal to 1024 microseconds (usec), and DW0 may be repeated every 16 DWs. According to this example, devices 202 and 240 may be able to discover each other at an interval of 8 seconds, e.g., a time period of interval 208

In some demonstrative embodiments, device 202 and/or 240 may have an increased power consumption, for example, if controllers 124 and/or 154 (FIG. 1) wake up devices 202 and/or 240 every DW of the plurality of DWs 204, to enable discovery of devices 202 and/or 240 every DW of the plurality of DWs 204, or every two consecutive DWs, to enable discovery of devices 202 and/or 240 every two consecutive DWs, e.g., in addition to the discovery during the DW0.

In some demonstrative embodiments, device 202 may be active during one or more first selected DWs of the plurality of DWs 204, e.g., in addition to DW0. For example, device 202 may be active during DW0 and a second DW, denoted DW2, of interval 208.

In some demonstrative embodiments, device 240 may be active during one or more second selected DWs of the plurality of DWs 204, e.g., in addition to DW0. For example, device 240 may be active during DW0 and a third DW, denoted DW3, of interval 208.

In some demonstrative embodiments, operating device 202 at the active state during the one or more first selected DWs and/or operating device 240 at the active state during the one or more second selected DWs may enable reduced power consumption, e.g., compared to a power consumption when remaining active during every DW of the plurality of DWs 204, and/or may reduce the time for discovery ("discovery latency"), e.g., compared to the time to discovery, when being active only during DW0.

In some demonstrative embodiments, devices 202 and/or 240 may not be able to discover each other, for example, if the one or more first selected DWs utilized by device 202 are not synchronized with the one or more second DWs utilized by device 240. For example, as shown in FIG. 2, device 202 may wake up during DW2 to transmit a discovery frame 214. However, device 240 may be at the sleep state during DW2, and may not be able to receive discovery frame 214.

As shown in FIG. 2, although device 240 may wake up during DW3, device 240 may not receive any discovery frame from device 202 and device 202 may not receive any discovery frame from device 240. As shown in FIG. 2, although device 202 wakes up between corresponding repetitions of DW0, e.g., during DW2, and device 240 wakes up between repetitions of DW0, e.g., during DW3, devices 202 and 240 may not discover each other between the repetitions of DW0.

Referring back to FIG. 1, some demonstrative embodiments may enable discovery of devices 102 and/or 140 using one or more selected DWs between DW0, e.g., as described below.

Some demonstrative embodiments may enable discovery of device 102 and/or 140 at a reduced time, e.g., less than 8 seconds.

In some demonstrative embodiments, devices 102 and/or 140 may implement a DW synchronization mechanism to synchronize one or more selected DWs between devices 102 and 140, for example, to enable devices 102 and/or 140 to discover each other during the one or more selected DWs.

In some demonstrative embodiments, the DW synchronization mechanism may include a DW synchronization ("the first DW synchronization mechanism"), which may be based negotiation and/or coordination between devices 102 and 140 of one or more selected DWs to be used in a discovery process. For example, devices may coordinate and/or negotiate during a first discovery process one or more selected DWs to be used during a second, subsequent, discovery process, e.g., as described below.

In some demonstrative embodiments, radios 114 and/or 144 may communicate a discovery frame 139 during a first discovery process.

In some demonstrative embodiments, transmitter 118 may transmit discovery frame 139 over WM 103, e.g., during DW0 or any other DW during which both devices 102 and 104 may be active.

In other embodiments, device 140 may perform the functionality of device 102 and vice versa. According to these embodiments, transmitter 148 may transmit discovery frame 139 to device 102.

In some demonstrative embodiments, discovery frame 139 may include an indication of one or more selected DWs of the plurality of DWs.

In some demonstrative embodiments, the one or more selected DWs may be based on a wakeup schedule of device 102.

In some demonstrative embodiments, the wakeup schedule of device 102 may indicate DWs of the plurality of DWs, at which device 102 wakes up from the power save state to the active state, e.g., to enable discovery of device 102.

In one example, the one or more selected DWs may be selected, negotiated and/or coordinated by a controller, e.g., controller 124 and/or 154.

In another example, the one or more selected DWs may be selected by application 125.

In another example, the one or more selected DWs may be selected by any other entity, object, method, and/or algorithm.

In some demonstrative embodiments, discovery frame 139 may include a DW wakeup schedule field including an indication of the one or more selected DWs.

In some demonstrative embodiments, the DW wake-up schedule field may include a plurality of bits.

In some demonstrative embodiments, a number of the plurality of bits may be equal to a number of the plurality of DWs.

In some demonstrative embodiments, each bit of the plurality of bits may represent a respective DW of the plurality of DWs.

In some demonstrative embodiments, a number of the plurality of bits may be equal to the predefined number of the DWs of the interval.

In some demonstrative embodiments, a bit of the plurality of bits may have either a first value to indicate the DW corresponding to the bit is selected, or a second value to indicate the DW is not selected. For example, the bit may be set to "1" to indicate that the DW is selected, or the bit may be set to "0" to indicate that the DW is not selected.

In one example, the DW wake-up schedule field may include a 2-byte field including sixteen bits, for example, if the interval includes sixteen DWs, e.g., as described above. According to this example, a first bit of the DW wake-up schedule field may be set to the value "0" to indicate that device 102 is not guaranteed to be at the active state during the DW1, a second bit may be set to a value of "1" to indicate that device 102 is to be at the active state during the DW2, a third bit may be set to a value of "1" to indicate that device 102 is to be at the active state during the DW3, and/or a fifth bit may be set to a value of "0" to indicate that device 102 is not guaranteed to be at the active state during the DW5, e.g., device 102 may be at the sleep state during the DW5, and so on.

Reference is made to FIG. 3, which schematically illustrates a DW wake-up schedule attribute 300, in accordance with some demonstrative embodiments.

In some demonstrative embodiments, the DW wake-up schedule attribute 300 may be communicated as part of a discovery frame during a discovery process, e.g., as part of a NAN service discovery frame. For example, the DW wake-up schedule attribute 300 may be communicated as part of discovery frame 139 (FIG. 1).

As shown in FIG. 3, the DW wake-up schedule attribute 300 may include an attribute ID field 302, e.g., having a size of one octet, configured to identify a type of the DW wake-up schedule attribute 300.

As shown in FIG. 3, the DW wake-up schedule attribute 300 may include a length field 304, e.g., having a size of two octets, configured to specify a length of the fields of the DW wake-up schedule attribute 300.

As shown in FIG. 3, the DW wake-up schedule attribute 300 may include a DW wake-up schedule field 306, e.g., having a size of two octets, configured to include a DW schedule bitmap, e.g., including the plurality of bits representing the one or more selected DWs, e.g., as described above.

Referring back to FIG. 1, in some demonstrative embodiments, controller 124 may switch device 102 to operate in the active state in the one or more selected DWs to discover device 140 during a second discovery process, subsequent to the first discovery process. For example, controller 124 may switch device 102 to operate in the active state during DW2 and DW3 of the second discovery process, e.g., if during the first discovery process device 102 communicates frame 300 (FIG. 3) with filed 306 (FIG. 3) indicating DW2 and DW3 are selected for discovery.

In some demonstrative embodiments, controller 124 may switch device 102 to operate in the active state in the one or more selected DWs, for example, after communication of discovery frame 139 during the first discovery process.

In some demonstrative embodiments, receiver 146 may receive discovery frame 139 from device 102.

In some demonstrative embodiments, controller 154 may switch device 140 to operate in the active state in the one or more selected DWs, for example, based on the DW wake-up schedule field in discovery frame 139 from device 102, e.g., based on field 306 (FIG. 3).

In some demonstrative embodiments, controller 154 may switch device 140 to operate in the active state in the one or more selected DWs to discover device 102 during the second discovery process. For example, controller 154 may switch device 140 to operate in the active state during DW2 and DW3 of the second discovery process, e.g., if during the first discovery process device 102 communicates frame 300 (FIG. 3) with field 306 (FIG. 3) indicating DW2 and DW3 are selected for discovery.

In some demonstrative embodiments, communicating the indication of the selected DWs between devices 102 and 140 during the first discovery process, e.g., using field 306 (FIG. 3), may enable devices 102 and 140 to synchronize the DWs in which devices 102 and 140 are to be at the active state during the second discovery process. Accordingly, devices 102 and/or 140 may be able to discover each other at the selected DWs during the second discovery process.

In one example, during the first discovery process, controller 124 may set bits 2 and 3 of field 306 (FIG. 3) in discovery frame 139 to the value 1, while all other bits of field 306 (FIG. 3) may be set to 0. According to this example, both devices 102 and 140 may wake up during DW2 and/or DW3 in the second discovery process, to enable discovery of devices 102 and 140 during DW2 and DW3.

In some demonstrative embodiments, devices 102 and/or 140 may synchronize the one or more selected DWs without negotiating and/or coordinating the one or more selected DWs, for example, without using discovery frame 139.

In some demonstrative embodiments, the DW synchronization mechanism may include a synchronization mechanism ("the second DW synchronization mechanism"), which may be based on a "local" or "internal" indication of the one or more selected DWs, e.g., as described below.

In some demonstrative embodiments, controller 124 may receive from an element of device 102 an indication of the one or more selected DWs of the plurality of DWs In some demonstrative embodiments, controller 124 may receive an indication 129 of the one or more selected DWs of the plurality of DWs, e.g., from application 125.

In other embodiments, controller 124 may receive indication 129 from any other element of device 102, e.g., a firmware of device 102, an operating system of device 102 and/or the like.

In some demonstrative embodiments, controller 154 may receive from an element of device 140 an indication of the one or more selected DWs of the plurality of DWs.

In some demonstrative embodiments, controller 154 may receive an indication 149 of the one or more selected DWs of the plurality of DWs, e.g., from application 145.

In other embodiments, controller 154 may receive indication 149 from any other element of device 140, e.g., a firmware of device 140, an operating system of device 140 and/or the like.

In some demonstrative embodiments, applications 125 and/or 145 may include corresponding applications.

In one example, applications 125 and/or 145 may include the same application, application of the same type, or applications from a common source or vendor, e.g., a social application, a file sharing application, and/or the like.

In another example, applications 125 and/or 145 may include applications, which have the same predefined set of DWs from the plurality of DWs for discovery.

In some demonstrative embodiments, different applications may have different selected DWs.

For example, controller 124 may receive one or more first selected DWs from application 125, e.g., in an indication 129, and one or more second selected DWs from an application 126 executed by device 102, e.g., in an indication 127. According to this example, application 125 may be different from application 126, and the one or more first selected DWs may be different from the one or more second DWs.

In some demonstrative embodiments, controller 124 may switch device 102 to operate in the active state during the one or more selected DWs, e.g., based on indication 129.

In some demonstrative embodiments, controller 154 may switch device 140 to operate in the active state during the one or more selected DWs, e.g., based on indication 149.

In some demonstrative embodiments, switching both devices 102 and 140 to the active state during the same one or more selected DWs, e.g., which may be indicated by applications 145 and 125, may synchronize the DWs during which devices 102 and 140 may be active, and may ensure that devices 102 and 140 may be able to discover each other in the one or more selected DWs.

In some demonstrative embodiments, a first device of devices 102 and/or 140, e.g., device 102, may attempt to discover a second device of devices 102 and/or 140, e.g., device 140.

For example, transmitter 118 may transmit discovery frames during the one or more selected DWs. Receiver 146 may receive a discovery frame of the discovery frames from device 102 during the DW.

As a result, device 102 may discover device 140, for example, once an acknowledgement frame to acknowledge receipt of the discovery frame is received by receiver 116.

In some demonstrative embodiments, devices 102 and 140 may be able to discover each other, for example, since both devices 102 and 140 are in the active state during the selected DWs.

In one example, indications 129 and 149 may indicate DW3 is selected, for example, if both applications 125 and 145 define DW3 is to be used for discovery. According to this example, both devices 102 and 140 may wake up to enable discovery during DW3. As a result, device 102 and/or 140 may discover each other during DW3.

Figure 4:
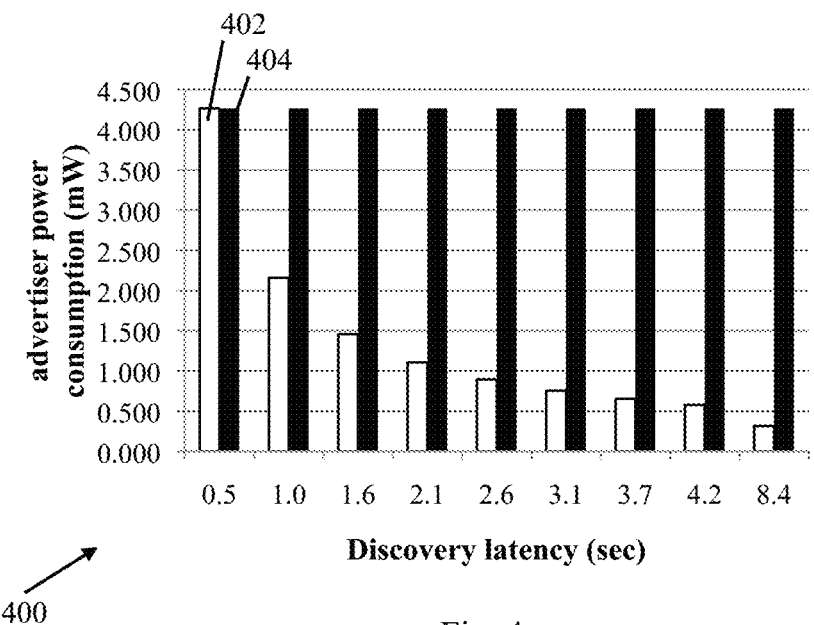
FIG. 4 is a schematic illustration of a graph depicting discovery latency versus power consumption, in accordance with some demonstrative embodiments.

Reference is made to FIG. 4, which schematically illustrates a graph 400 depicting discovery latency versus power consumption, in accordance with some demonstrative embodiments.

In some demonstrative embodiments, graph 400 may illustrate a first power consumption 402 of a first wireless communication device using a DW synchronization mechanism, e.g., the first or second DW synchronization mechanisms described above, and a second power consumption 404 of a second wireless communication device not using the DW synchronization mechanism. For example, the first wireless communication device may perform the functionality of devices 102 and/or 140.

As shown in FIG. 4, the first power consumption 402 may reduce, e.g., as the discovery latency increases, while the second power consumption 404 may remain unchanged as the discovery latency increases.

In some demonstrative embodiments, the decrease in first power consumption 402 may enable saving power of the first wireless communication device, e.g., by increasing the discovery latency.

Figure 5:
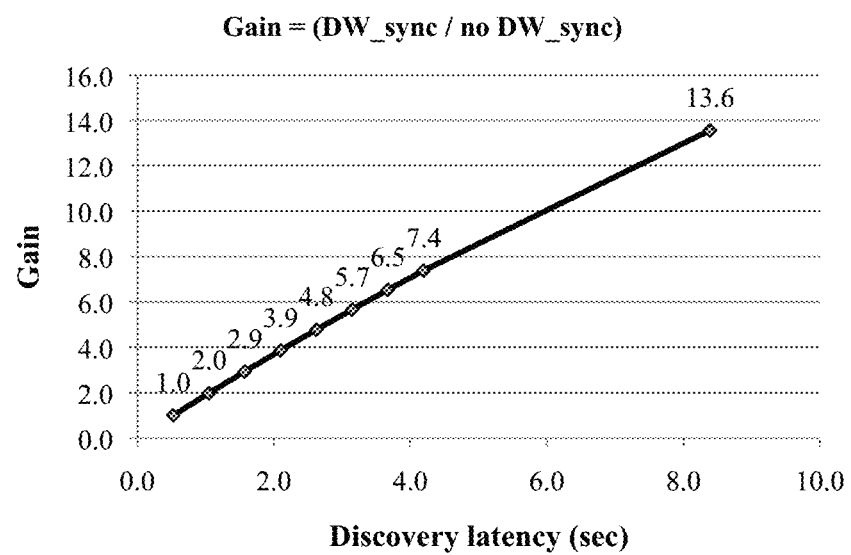
FIG. 5 is a schematic illustration of a graph depicting discovery latency versus gain ratio, in accordance with some demonstrative embodiments.

Reference is made to FIG. 5, which schematically illustrates a graph 500 depicting discovery latency versus gain ratio, in accordance with some demonstrative embodiments.

In some demonstrative embodiments, the gain ratio may include a ratio between a first gain of a first wireless communication device using a DW synchronization mechanism, e.g., the first or second DW synchronization mechanisms described above, and a second gain of a second wireless communication device not using the DW synchronization mechanism. For example, the first wireless communication device may perform the functionality of devices 102 and/or 140 (FIG. 1).

As shown in FIG. 5, the gain ratio may increase, as the discovery latency increases. Accordingly, the benefits provided by the DW synchronization mechanism may increase, for example, when increasing the allowed discovery latency.

Figure 6:
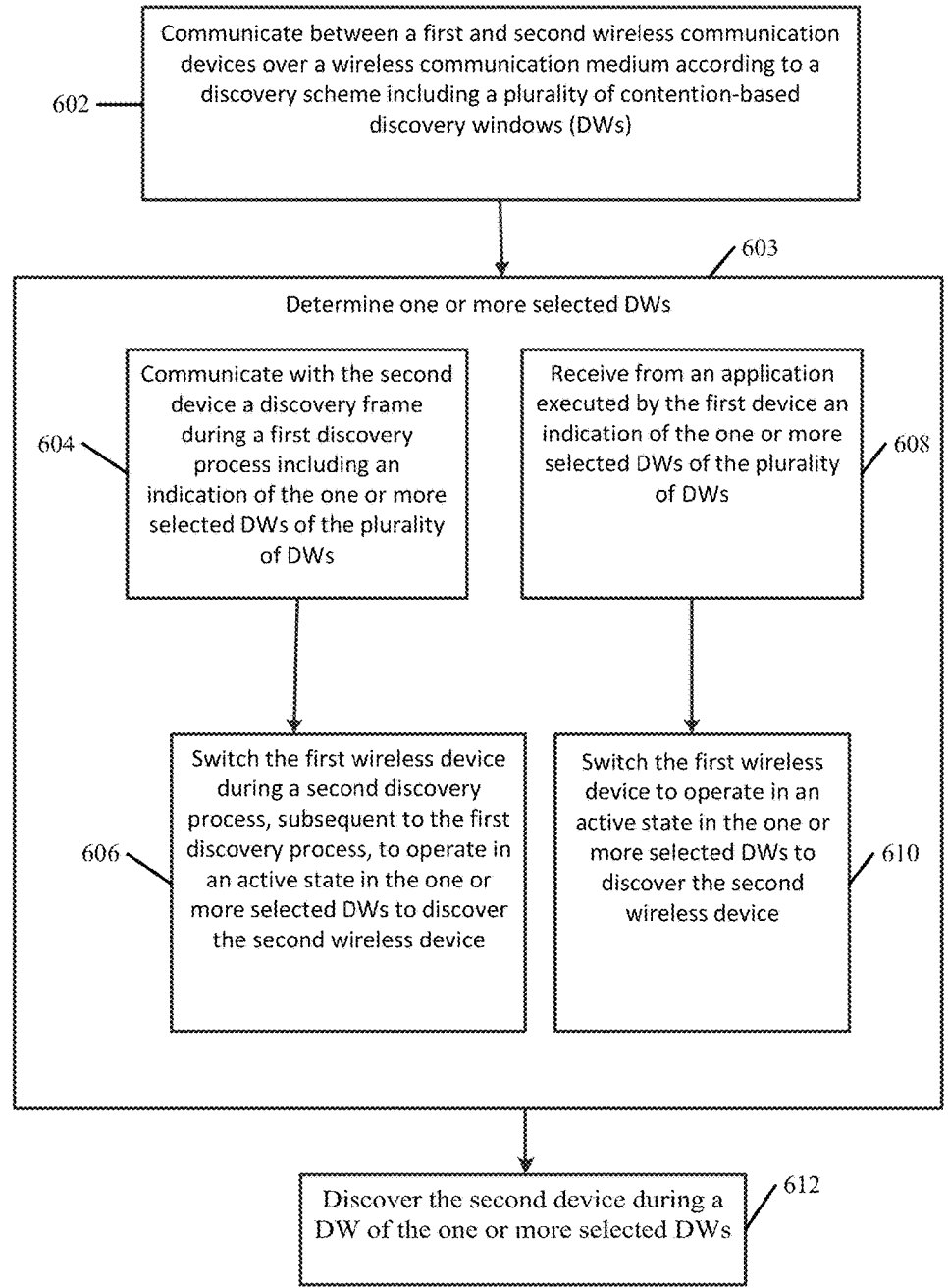
FIG. 6 is a schematic flow-chart illustration of a method of discovering a wireless communication device, in accordance with some demonstrative embodiments.

Reference is made to FIG. 6, which schematically illustrates a method of discovering a wireless communication device, in accordance with some demonstrative embodiments. For example, one or more of the operations of the method of FIG. 6 may be performed by a wireless communication system, e.g., system 100 (FIG. 1); a wireless communication device, e.g., devices 102 and/or 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); and/or a receiver, e.g., receivers 116 and/or 146 (FIG. 1).

In some demonstrative embodiments, the method of FIG. 6 may be performed at a first wireless communication device, e.g., device 102 (FIG. 1) to discover a second wireless communication device, e.g. device 140 (FIG. 1).

As indicated at block 602, the method may include communicating between the first and second wireless communication devices over a wireless communication medium according to a discovery scheme including a plurality of contention-based discovery windows (DWs). For example, devices 102 and/or 140 (FIG. 1) may communicate over wireless communication medium 103 (FIG. 1) according to the discovery scheme including the plurality of DWs, e.g., as described above.

As indicated at block 603, the method may include determining one or more selected DWs, during which the first device is to be active. For example, controller 124 (FIG. 1) may determine the one or more selected DWs, during which device 102 is to be active, e.g., as described above.

In some demonstrative embodiments, determining the one or more selected DWs may include determining the one or more selected DWs by communicating an indication of the selected DWs between the first and second wireless communication devices, e.g., as described below with reference to blocks 604 and 606.

In other demonstrative embodiments, determining the one or more selected DWs may include determining the one or more selected DWs based on an indication from an element of the first wireless communication device, e.g., as described below with reference to blocks 608 and 610.

As indicated at block 604, the method may include communicating a discovery frame during a first discovery process including an indication of the one or more selected DWs. For example, device 102 (FIG. 1) may communicate with device 140 (FIG. 1) indication 139 (FIG. 1) during the first discovery process, e.g., as described above.

As indicated at block 606, the method may include switching during a second discovery process, subsequent to the first discovery process, the first wireless device to operate in an active state in the one or more selected DWs to discover the second wireless device. For example, controller 124 (FIG. 1) may switch device 102 (FIG. 1) to the active state during the selected DWs in the second discovery process to discover device 140 (FIG. 1), e.g., as described above.

As indicated at block 608, the method may include receiving from an application executed by the first device an indication of one or more selected DWs of the plurality of DWs. For example, controller 124 (FIG. 1) may receive indication 129 (FIG. 1) from application 125 (FIG. 1), e.g., as described above.

As indicated at block 610, the method may include switching the first wireless device to operate in the active state in the one or more selected DWs to discover the second wireless device. For example, controller 124 (FIG. 1) may switch device 102 (FIG. 1) to the active state during the selected DWs to discover device 140 (FIG. 1), e.g., as described above.

As indicated at block 612, the method may include discovering the second device during a DW of the one or more selected DWs. For example, device 102 (FIG. 1) may discover device 140 during a selected DW, e.g., DW3, e.g., as described above.

Figure 7:
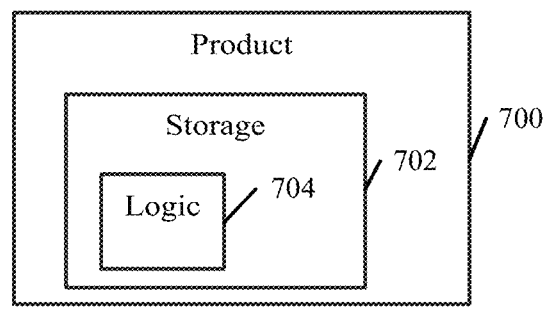
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

Examples

The following examples pertain to further embodiments.

Example 1 includes a first wireless device comprising a radio to communicate over a wireless communication medium according to a discovery scheme including a plurality of contention-based discovery windows (DWs), the radio to communicate with a second wireless device a discovery frame during a first discovery process, the discovery frame including an indication of one or more selected DWs of the plurality of DWs; and a controller to switch the first wireless device between a power save state and an active state, the controller to switch the first wireless device to operate in the active state in the one or more selected discovery windows to discover the second wireless device during a second discovery process, subsequent to the first discovery process.

Example 2 includes the subject matter of Example 1, and optionally, wherein the radio is to transmit the discovery frame to the second wireless device.

Example 3 includes the subject matter of Example 2, and optionally, wherein the one or more selected DWs are based on a wakeup schedule of the first wireless device.

Example 4 includes the subject matter of Example 1, and optionally, wherein the radio is to receive the discovery frame from the second wireless device.

Example 5 includes the subject matter of Example 4, and optionally, wherein the one or more selected DWs are based on a wakeup schedule of the second wireless device.

Example 6 includes the subject matter of any one of Examples 1-5, and optionally, wherein the discovery frame includes a DW wakeup schedule field including an indication of the one or more selected DWs.

Example 7 includes the subject matter of Example 6, and optionally, wherein the DW wake-up schedule field includes a plurality of bits, each bit representing a respective DW of the plurality of DWs, the bit having either a first value to indicate the DW is selected, or a second value to indicate the DW is not selected.

Example 8 includes the subject matter of any one of Examples 1-7, and optionally, wherein the controller is to periodically switch the first wireless device to the active state at an interval including a predefined number of DWs, and wherein the one or more selected DWs are within the interval.

Example 9 includes the subject matter of Example 8, and optionally, wherein the interval includes sixteen DWs.

Example 10 includes the subject matter of any one of Examples 1-9, and optionally, wherein the controller is to determine the plurality of DWs according to 4 bits of a Time Synchronization Function (TSF) value.

Example 11 includes the subject matter of any one of Examples 1-10, and optionally, wherein the wireless communication medium comprises a wireless communication channel over a 2.4 Gigahertz (GHz) frequency band or a 5 GHz frequency band.

Example 12 includes the subject matter of any one of Examples 1-11 being a Neighbor Awareness Networking (NAN) device.

Example 13 includes the subject matter of any one of Examples 1-12 including one or more antennas, a processor, and a memory.

Example 14 includes a first Neighbor Awareness Networking (NAN) device comprising a radio to communicate over a wireless communication medium according to a discovery scheme including a plurality of contention-based discovery windows (DWs); and a controller to switch the first NAN device between a power save state and an active state, the controller to receive from an application executed by the first NAN device an indication of one or more selected DWs of the plurality of DWs, and to switch the first NAN device to operate in the active state during the one or more selected DWs.

Example 15 includes the subject matter of Example 14, and optionally, wherein the controller is to receive one or more first selected DWs from a first application executed by the first NAN device, and one or more second selected DWs from a second application executed by the first NAN device, the second application being different from the first application, and the one or more first selected DWs being different from the one or more second DWs.

Example 16 includes the subject matter of Example 14 or 15, and optionally, wherein the controller is to discover a second NAN device executing the application during a DW of the one or more selected DWs.

Example 17 includes the subject matter of Example 16, and optionally, wherein the radio is to receive a discovery frame from the second NAN device during the DW.

Example 18 includes the subject matter of any one of Examples 14-17, and optionally, wherein the radio is to transmit discovery frames during the one or more selected DWs.

Example 19 includes the subject matter of any one of Examples 14-18, and optionally, wherein the controller is to periodically switch the first NAN device to the active state at an interval including a predefined number of DWs, and wherein the one or more selected DWs are within the interval.

Example 20 includes the subject matter of Example 19, and optionally, wherein the interval includes sixteen DWs.

Example 21 includes the subject matter of any one of Examples 14-20, and optionally, wherein the controller is to determine the plurality of DWs according to 4 bits of a Time Synchronization Function (TSF) value.

Example 22 includes the subject matter of any one of Examples 14-21, and optionally, wherein the wireless communication medium comprises a wireless communication channel over a 2.4 Gigahertz (GHz) frequency band or a 5 GHz frequency band.

Example 23 includes the subject matter of any one of Examples 14-22 including one or more antennas, a processor, and a memory.

Example 24 includes a wireless communication system including a first wireless device, the first wireless device comprising one or more antennas; a memory; a processor; a radio to communicate over a wireless communication medium according to a discovery scheme including a plurality of contention-based discovery windows (DWs), the radio to communicate with a second wireless device a discovery frame during a first discovery process, the discovery frame including an indication of one or more selected DWs of the plurality of DWs; and a controller to switch the first wireless device between a power save state and an active state, the controller to switch the first wireless device to operate in the active state in the one or more selected discovery windows to discover the second wireless device during a second discovery process, subsequent to the first discovery process.

Example 25 includes the subject matter of Example 24, and optionally, wherein the radio is to transmit the discovery frame to the second wireless device.

Example 26 includes the subject matter of Example 25, and optionally, wherein the one or more selected DWs are based on a wakeup schedule of the first wireless device.

Example 27 includes the subject matter of Example 24, and optionally, wherein the radio is to receive the discovery frame from the second wireless device.

Example 28 includes the subject matter of Example 27, and optionally, wherein the one or more selected DWs are based on a wakeup schedule of the second wireless device.

Example 29 includes the subject matter of any one of Examples 24-28, and optionally, wherein the discovery frame includes a DW wakeup schedule field including an indication of the one or more selected DWs.

Example 30 includes the subject matter of Example 29, and optionally, wherein the DW wake-up schedule field includes a plurality of bits, each bit representing a respective DW of the plurality of DWs, the bit having either a first value to indicate the DW is selected, or a second value to indicate the DW is not selected.

Example 31 includes the subject matter of any one of Examples 24-30, and optionally, wherein the controller is to periodically switch the first wireless device to the active state at an interval including a predefined number of DWs, and wherein the one or more selected DWs are within the interval.

Example 32 includes the subject matter of Example 31, and optionally, wherein the interval includes sixteen DWs.

Example 33 includes the subject matter of any one of Examples 24-32, and optionally, wherein the controller is to determine the plurality of DWs according to 4 bits of a Time Synchronization Function (TSF) value.

Example 34 includes the subject matter of any one of Examples 24-33, and optionally, wherein the wireless communication medium comprises a wireless communication channel over a 2.4 Gigahertz (GHz) frequency band or a 5 GHz frequency band.

Example 35 includes the subject matter of any one of Examples 24-34, and optionally, wherein the first wireless device being a Neighbor Awareness Networking (NAN) device.

Example 36 includes a wireless communication system including a first Neighbor Awareness Networking (NAN) device, the first NAN device comprising one or more antennas; a memory; a processor; a radio to communicate over a wireless communication medium according to a discovery scheme including a plurality of contention-based discovery windows (DWs); and a controller to switch the first NAN device between a power save state and an active state, the controller to receive from an application executed by the first NAN device an indication of one or more selected DWs of the plurality of DWs, and to switch the first NAN device to operate in the active state during the one or more selected DWs.

Example 37 includes the subject matter of Example 36, and optionally, wherein the controller is to receive one or more first selected DWs from a first application executed by the first NAN device, and one or more second selected DWs from a second application executed by the first NAN device, the second application being different from the first application, and the one or more first selected DWs being different from the one or more second DWs.

Example 38 includes the subject matter of Example 36 or 37, and optionally, wherein the controller is to discover a second NAN device executing the application during a DW of the one or more selected DWs.

Example 39 includes the subject matter of Example 38, and optionally, wherein the radio is to receive a discovery frame from the second NAN device during the DW.

Example 40 includes the subject matter of any one of Examples 36-39, and optionally, wherein the radio is to transmit discovery frames during the one or more selected DWs.

Example 41 includes the subject matter of any one of Examples 36-40, and optionally, wherein the controller is to periodically switch the first NAN device to the active state at an interval including a predefined number of DWs, and wherein the one or more selected DWs are within the interval.

Example 42 includes the subject matter of Example 41, and optionally, wherein the interval includes sixteen DWs.

Example 43 includes the subject matter of any one of Examples 36-42, and optionally, wherein the controller is to determine the plurality of DWs according to 4 bits of a Time Synchronization Function (TSF) value.

Example 44 includes the subject matter of any one of Examples 36-43, and optionally, wherein the wireless communication medium comprises a wireless communication channel over a 2.4 Gigahertz (GHz) frequency band or a 5 GHz frequency band.

Example 45 includes a method performed by a first wireless device, the method comprising communicating over a wireless communication medium according to a discovery scheme including a plurality of contention-based discovery windows (DWs), the communicating including communicating with a second wireless device a discovery frame during a first discovery process, the discovery frame including an indication of one or more selected DWs of the plurality of DWs; and switching the first wireless device to operate in an active state in the one or more selected discovery windows to discover the second wireless device during a second discovery process, subsequent to the first discovery process.

Example 46 includes the subject matter of Example 45, and optionally, comprising, transmitting the discovery frame to the second wireless device.

Example 47 includes the subject matter of Example 46, and optionally, wherein the one or more selected DWs are based on a wakeup schedule of the first wireless device.

Example 48 includes the subject matter of Example 45, and optionally, comprising, receiving the discovery frame from the second wireless device.

Example 49 includes the subject matter of Example 48, and optionally, wherein the one or more selected DWs are based on a wakeup schedule of the second wireless device.

Example 50 includes the subject matter of any one of Examples 45-49, and optionally, wherein the discovery frame includes a DW wakeup schedule field including an indication of the one or more selected DWs.

Example 51 includes the subject matter of Example 50, and optionally, wherein the DW wake-up schedule field includes a plurality of bits, each bit representing a respective DW of the plurality of DWs, the bit having either a first value to indicate the DW is selected, or a second value to indicate the DW is not selected.

Example 52 includes the subject matter of any one of Examples 45-51, and optionally, comprising, periodically switching the first wireless device to the active state at an interval including a predefined number of DWs, and wherein the one or more selected DWs are within the interval.

Example 53 includes the subject matter of Example 52, and optionally, wherein the interval includes sixteen DWs.

Example 54 includes the subject matter of any one of Examples 45-53, and optionally, comprising, determining the plurality of DWs according to 4 bits of a Time Synchronization Function (TSF) value.

Example 55 includes the subject matter of any one of Examples 45-54, and optionally, wherein the wireless communication medium comprises a wireless communication channel over a 2.4 Gigahertz (GHz) frequency band or a 5 GHz frequency band.

Example 56 includes the subject matter of any one of Examples 45-55, and optionally, wherein the first wireless device being a Neighbor Awareness Networking (NAN) device.

Example 57 includes a method performed by a first Neighbor Awareness Networking (NAN) device, the method comprising communicating over a wireless communication medium according to a discovery scheme including a plurality of contention-based discovery windows (DWs); receiving from an application executed by the first NAN device an indication of one or more selected DWs of the plurality of DWs; and switching the first NAN device to operate in an active state during the one or more selected DWs.

Example 58 includes the subject matter of Example 57, and optionally, comprising, receiving one or more first selected DWs from a first application executed by the first NAN device, and one or more second selected DWs from a second application executed by the first NAN device, the second application being different from the first application, and the one or more first selected DWs being different from the one or more second DWs.

Example 59 includes the subject matter of Example 57 or 58, and optionally, comprising, discovering a second NAN device executing the application during a DW of the one or more selected DWs.

Example 60 includes the subject matter of Example 59, and optionally, comprising, receiving a discovery frame from the second NAN device during the DW.

Example 61 includes the subject matter of any one of Examples 57-60, and optionally, comprising, transmitting discovery frames during the one or more selected DWs.

Example 62 includes the subject matter of any one of Examples 57-61, and optionally, comprising, periodically switching the first NAN device to the active state at an interval including a predefined number of DWs, wherein the one or more selected DWs are within the interval.

Example 63 includes the subject matter of Example 62, and optionally, wherein the interval includes sixteen DWs.

Example 64 includes the subject matter of any one of Examples 57-63, and optionally, comprising, determining the plurality of DWs according to 4 bits of a Time Synchronization Function (TSF) value.

Example 65 includes the subject matter of any one of Examples 57-64, and optionally, wherein the wireless communication medium comprises a wireless communication channel over a 2.4 Gigahertz (GHz) frequency band or a 5 GHz frequency band.

Example 66 includes a product including one or more tangible computer-readable non-transitory storage media comprising computer-executable instructions operable to, when executed by at least one computer processor, enable the at least one computer processor to implement a method at a first wireless device, the method comprising communicating over a wireless communication medium according to a discovery scheme including a plurality of contention-based discovery windows (DWs), the communicating including communicating with a second wireless device a discovery frame during a first discovery process, the discovery frame including an indication of one or more selected DWs of the plurality of DWs; and switching the first wireless device to operate in an active state in the one or more selected discovery windows to discover the second wireless device during a second discovery process, subsequent to the first discovery process.

Example 67 includes the subject matter of Example 66, and optionally, wherein the method comprises transmitting the discovery frame to the second wireless device.

Example 68 includes the subject matter of Example 67, and optionally, wherein the one or more selected DWs are based on a wakeup schedule of the first wireless device.

Example 69 includes the subject matter of Example 66, and optionally, wherein the method comprises receiving the discovery frame from the second wireless device.

Example 70 includes the subject matter of Example 69, and optionally, wherein the one or more selected DWs are based on a wakeup schedule of the second wireless device.

Example 71 includes the subject matter of any one of Examples 66-70, and optionally, wherein the discovery frame includes a DW wakeup schedule field including an indication of the one or more selected DWs.

Example 72 includes the subject matter of Example 71, and optionally, wherein the DW wake-up schedule field includes a plurality of bits, each bit representing a respective DW of the plurality of DWs, the bit having either a first value to indicate the DW is selected, or a second value to indicate the DW is not selected.

Example 73 includes the subject matter of any one of Examples 66-72, and optionally, wherein the method comprises periodically switching the first wireless device to the active state at an interval including a predefined number of DWs, and wherein the one or more selected DWs are within the interval.

Example 74 includes the subject matter of Example 73, and optionally, wherein the interval includes sixteen DWs.

Example 75 includes the subject matter of any one of Examples 66-74, and optionally, wherein the method comprises determining the plurality of DWs according to 4 bits of a Time Synchronization Function (TSF) value.

Example 76 includes the subject matter of any one of Examples 66-75, and optionally, wherein the wireless communication medium comprises a wireless communication channel over a 2.4 Gigahertz (GHz) frequency band or a 5 GHz frequency band.

Example 77 includes the subject matter of any one of Examples 66-76, and optionally, wherein the first wireless device being a Neighbor Awareness Networking (NAN) device.

Example 78 includes a product including one or more tangible computer-readable non-transitory storage media comprising computer-executable instructions operable to, when executed by at least one computer processor, enable the at least one computer processor to implement a method at a first Neighbor Awareness Networking (NAN) device, the method comprising communicating over a wireless communication medium according to a discovery scheme including a plurality of contention-based discovery windows (DWs); receiving from an application executed by the first NAN device an indication of one or more selected DWs of the plurality of DWs; and switching the first NAN device to operate in an active state during the one or more selected DWs.

Example 79 includes the subject matter of Example 78, and optionally, wherein the method comprises receiving one or more first selected DWs from a first application executed by the first NAN device, and one or more second selected DWs from a second application executed by the first NAN device, the second application being different from the first application, and the one or more first selected DWs being different from the one or more second DWs.

Example 80 includes the subject matter of Example 78 or 79, and optionally, wherein the method comprises discovering a second NAN device executing the application during a DW of the one or more selected DWs.

Example 81 includes the subject matter of Example 80, and optionally, wherein the method comprises receiving a discovery frame from the second NAN device during the DW.

Example 82 includes the subject matter of any one of Examples 78-81, and optionally, wherein the method comprises transmitting discovery frames during the one or more selected DWs.

Example 83 includes the subject matter of any one of Examples 78-82, and optionally, wherein the method comprises periodically switching the first NAN device to the active state at an interval including a predefined number of DWs, and wherein the one or more selected DWs are within the interval.

Example 84 includes the subject matter of Example 83, and optionally, wherein the interval includes sixteen DWs.

Example 85 includes the subject matter of any one of Examples 78-84, and optionally, wherein the method comprises determining the plurality of DWs according to 4 bits of a Time Synchronization Function (TSF) value.

Example 86 includes the subject matter of any one of Examples 78-85, and optionally, wherein the wireless communication medium comprises a wireless communication channel over a 2.4 Gigahertz (GHz) frequency band or a 5 GHz frequency band.

Example 87 includes an apparatus comprising means for communicating at a first wireless device over a wireless communication medium according to a discovery scheme including a plurality of contention-based discovery windows (DWs), the communicating including communicating with a second wireless device a discovery frame during a first discovery process, the discovery frame including an indication of one or more selected DWs of the plurality of DWs; and means for switching the first wireless device to operate in an active state in the one or more selected discovery windows to discover the second wireless device during a second discovery process, subsequent to the first discovery process.

Example 88 includes the subject matter of Example 87, and optionally, comprising, means for transmitting the discovery frame to the second wireless device.

Example 89 includes the subject matter of Example 88, and optionally, wherein the one or more selected DWs are based on a wakeup schedule of the first wireless device.

Example 90 includes the subject matter of Example 87, and optionally, comprising, means for receiving the discovery frame from the second wireless device.

Example 91 includes the subject matter of Example 90, and optionally, wherein the one or more selected DWs are based on a wakeup schedule of the second wireless device.

Example 92 includes the subject matter of any one of Examples 87-91, and optionally, wherein the discovery frame includes a DW wakeup schedule field including an indication of the one or more selected DWs.

Example 93 includes the subject matter of Example 92, and optionally, wherein the DW wake-up schedule field includes a plurality of bits, each bit representing a respective DW of the plurality of DWs, the bit having either a first value to indicate the DW is selected, or a second value to indicate the DW is not selected.

Example 94 includes the subject matter of any one of Examples 87-93, and optionally, comprising, means for periodically switching the first wireless device to the active state at an interval including a predefined number of DWs, and wherein the one or more selected DWs are within the interval.

Example 95 includes the subject matter of Example 94, and optionally, wherein the interval includes sixteen DWs.

Example 96 includes the subject matter of any one of Examples 87-95, and optionally, comprising, means for determining the plurality of DWs according to 4 bits of a Time Synchronization Function (TSF) value.

Example 97 includes the subject matter of any one of Examples 87-96, and optionally, wherein the wireless communication medium comprises a wireless communication channel over a 2.4 Gigahertz (GHz) frequency band or a 5 GHz frequency band.

Example 98 includes an apparatus comprising means for communicating at a first Neighbor Awareness Networking (NAN) device over a wireless communication medium according to a discovery scheme including a plurality of contention-based discovery windows (DWs); means for receiving from an application executed by the first NAN device an indication of one or more selected DWs of the plurality of DWs; and means for switching the first NAN device to operate in an active state during the one or more selected DWs.

Example 99 includes the subject matter of Example 98, and optionally, comprising, means for receiving one or more first selected DWs from a first application executed by the first NAN device, and one or more second selected DWs from a second application executed by the first NAN device, the second application being different from the first application, and the one or more first selected DWs being different from the one or more second DWs.

Example 100 includes the subject matter of Example 98 or 99, and optionally, comprising, means for discovering a second NAN device executing the application during a DW of the one or more selected DWs.

Example 101 includes the subject matter of Example 100, and optionally, comprising, means for receiving a discovery frame from the second NAN device during the DW.

Example 102 includes the subject matter of any one of Examples 98-101, and optionally, comprising, means for transmitting discovery frames during the one or more selected DWs.

Example 103 includes the subject matter of any one of Examples 98-102, and optionally, comprising, means for periodically switching the first NAN device to the active state at an interval including a predefined number of DWs, and wherein the one or more selected DWs are within the interval.

Example 104 includes the subject matter of Example 103, and optionally, wherein the interval includes sixteen DWs.

Example 105 includes the subject matter of any one of Examples 98-104, and optionally, comprising, means for determining the plurality of DWs according to 4 bits of a Time Synchronization Function (TSF) value.

Example 106 includes the subject matter of any one of Examples 98-105, and optionally, wherein the wireless communication medium comprises a wireless communication channel over a 2.4 Gigahertz (GHz) frequency band or a 5 GHz frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a wireless Neighbor Awareness Networking (NAN) device to:
determine a timing of a plurality of Discovery Windows (DWs) based on a Timing Synchronization Function (TSF);
transmit a frame comprising a field, which comprises a plurality of bits to identify which of the plurality of DWs are to be one or more selected DWs for the NAN device to be awake, based on a wakeup schedule of the NAN device; and
be awake based at least on the selected DWs, and during every DW (DW0) in which 23 least significant bits of the TSF are zero.

2. The apparatus of claim 1 configured to cause the NAN device to:
receive a first frame from an other NAN device during a first DW, which is included in the one or more selected DWs, the first frame comprising a field to identify one or more second DWs of the plurality of DWs, during which the other NAN device is to be awake; and
transmit a second frame to the other NAN device during a DW of the one or more second DWs.

3. The apparatus of claim 2, wherein at least one of the first frame or the second frame is a service discovery frame.

4. The apparatus of claim 1, wherein the frame comprises a service discovery frame.

5. The apparatus of claim 1, wherein the field has a size of two octets.

6. The apparatus of claim 1 configured to cause the NAN device to determine the wakeup schedule based on an indication from a service on the NAN device.

7. The apparatus of claim 1 configured to cause the NAN device to determine the timing of the plurality of DWs according to a time period of 512 Time Units (TUs) between consecutive DWs.

8. The apparatus of claim 1 configured to allow the NAN device not to be awake during one or more other DWs of the plurality of DWs.

9. The apparatus of claim 1 configured to allow the NAN device not to be awake during one or more periods between the plurality of DWs.

10. The apparatus of claim 1 configured to cause the NAN device to synchronize the plurality of DWs according to one or more synchronization beacons.

11. The apparatus of claim 1 comprising Medium Access Control (MAC) circuitry, and Physical Layer (PHY) circuitry.

12. The apparatus of claim 1 comprising a radio.

13. The apparatus of claim 1 comprising one or more antennas.

14. A product comprising one or more tangible computer-readable non-transitory storage media comprising computer-executable instructions operable to, when executed by at least one processor, enable the at least one processor to cause a wireless Neighbor Awareness Networking (NAN) device to:
determine a timing of a plurality of Discovery Windows (DWs) based on a Timing Synchronization Function (TSF);
transmit a frame comprising a field, which comprises a plurality of bits to identify which of the plurality of DWs are to be one or more selected DWs for the NAN device to be awake, based on a wakeup schedule of the NAN device; and
be awake based at least on the selected DWs, and during every DW (DW0) in which 23 least significant bits of the TSF are zero.

15. The product of claim 14, wherein the instructions, when executed, cause the NAN device to:
receive a first frame from an other NAN device during a first DW, which is included in the one or more selected DWs, the first frame comprising a field to identify one or more second DWs of the plurality of DWs, during which the other NAN device is to be awake; and
transmit a second frame to the other NAN device during a DW of the one or more second DWs.

16. The product of claim 15, wherein at least one of the first frame or the second frame is a service discovery frame.

17. The product of claim 14, wherein the frame comprises a service discovery frame.

18. The product of claim 14, wherein the field has a size of two octets.

19. The product of claim 14, wherein the instructions, when executed, cause the NAN device to determine the wakeup schedule based on an indication from a service on the NAN device.

20. The product of claim 14, wherein the instructions, when executed, cause the NAN device to determine the timing of the plurality of DWs according to a time period of 512 Time Units (TUs) between consecutive DWs.

21. The product of claim 14, wherein the instructions, when executed, cause to allow the NAN device not to be awake during one or more other DWs of the plurality of DWs.

22. The product of claim 14, wherein the instructions, when executed, cause to allow the NAN device not to be awake during one or more periods between the plurality of DWs.

23. The product of claim 14, wherein the instructions, when executed, cause the NAN device to synchronize the plurality of DWs according to one or more synchronization beacons.

24. An apparatus comprising:
a memory; and
a processor configured to cause a first wireless Neighbor Awareness Networking (NAN) device to:
determine a timing of a plurality of Discovery Windows (DWs) based on a Timing Synchronization Function (TSF), and be awake during every DW (DW0) in which 23 least significant bits of the TSF are zero;
receive a first frame from a second NAN device, the first frame comprising a field, which comprises a plurality of bits to indicate one or more DWs of the plurality of DWs, during which the second NAN device is to be awake; and allow the first NAN device to transmit a second frame to the second NAN device during a DW of the one or more DWs, during which the second NAN device is to be awake.

25. The apparatus of claim 24 configured to cause the first NAN device to transmit a service discovery frame comprising an information field to indicate during which of the plurality of DWs the first NAN device is to be awake.

26. The apparatus of claim 24, wherein the first frame is a service discovery frame.

27. The apparatus of claim 24, wherein the second frame is a service discovery frame.

28. The apparatus of claim 24, wherein the field has a size of two octets.

29. The apparatus of claim 24 configured to cause the first NAN device to determine the timing of the plurality of DWs according to a time period of 512 Time Units (TUs) between consecutive DWs.

30. The apparatus of claim 24 configured to cause the first NAN device to synchronize the plurality of DWs according to one or more synchronization beacons.

31. The apparatus of claim 24 comprising Medium Access Control (MAC) circuitry, and Physical Layer (PHY) circuitry.

32. The apparatus of claim 24 comprising a radio.

33. The apparatus of claim 24 comprising one or more antennas.

34. A product comprising one or more tangible computer-readable non-transitory storage media comprising computer-executable instructions operable to, when executed by at least one processor, enable the at least one processor to cause a first wireless Neighbor Awareness Networking (NAN) device to:

determine a timing of a plurality of Discovery Windows (DWs) based on a Timing Synchronization Function (TSF), and be awake during every DW (DW0) in which 23 least significant bits of the TSF are zero;

receive a first frame from a second NAN device, the first frame comprising a field, which comprises a plurality of bits to indicate one or more DWs of the plurality of DWs, during which the second NAN device is to be awake; and allow the first NAN device to transmit a second frame to the second NAN device during a DW of the one or more DWs, during which the second NAN device is to be awake.

35. The product of claim 34, wherein the instructions, when executed, cause the first NAN device to transmit a service discovery frame comprising an information field to indicate during which of the plurality of DWs the first NAN device is to be awake.

36. The product of claim 34, wherein the first frame is a service discovery frame.

37. The product of claim 34, wherein the second frame is a service discovery frame.

38. The product of claim 34, wherein the field has a size of two octets.

39. The product of claim 34, wherein the instructions, when executed, cause the first NAN device to determine the timing of the plurality of DWs according to a time period of 512 Time Units (TUs) between consecutive DWs.

40. The product of claim 34, wherein the instructions, when executed, cause the first NAN device to synchronize the plurality of DWs according to one or more synchronization beacons.

* * * * *